(12) United States Patent
Sipido et al.

(10) Patent No.: US 10,807,559 B2
(45) Date of Patent: Oct. 20, 2020

(54) PEDESTRIAN PROTECTION SYSTEM FOR A MOTOR VEHICLE

(71) Applicant: FORD GLOBAL TECHNOLOGIES, LLC, Dearborn, MI (US)

(72) Inventors: Antje Sipido, Frechen (DE); Monika Teodorescu, Cologne-Heimersdorf (DE); Susanne Spaetgens, Kaarst (DE); Joergen Hilmann, Leverkusen (DE); Tobias Duffe, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/907,800

(22) Filed: Feb. 28, 2018

(65) Prior Publication Data

US 2018/0272986 A1 Sep. 27, 2018

(30) Foreign Application Priority Data

Mar. 27, 2017 (DE) .......... 10 2017 205 082

(51) Int. Cl.
| | | |
|---|---|---|
| *B60R 21/34* | (2011.01) | |
| *B60R 19/40* | (2006.01) | |
| *B60R 19/02* | (2006.01) | |
| *B60R 19/14* | (2006.01) | |
| *B60R 19/18* | (2006.01) | |

(52) U.S. Cl.
CPC .......... *B60R 21/34* (2013.01); *B60R 19/023* (2013.01); *B60R 19/14* (2013.01); *B60R 19/40* (2013.01); *B60R 2019/186* (2013.01); *B60R 2021/343* (2013.01); *B60R 2021/346* (2013.01)

(58) Field of Classification Search
CPC ....... B60R 19/14; B60R 19/40; B60R 19/023; B60R 21/34; B60R 2021/346; B60R 2021/343; B60R 2019/186

USPC .......................................................... 293/142
See application file for complete search history.

(56) References Cited

U.S. PATENT DOCUMENTS 6,394,512 B1 * 5/2002 Schuster ................. B60R 19/12
293/118
6,637,788 B1 10/2003 Zoellner et al.

FOREIGN PATENT DOCUMENTS

| DE | 10031374 A1 | 1/2002 | |
|---|---|---|---|
| DE | 102004059747 A1 * | 6/2006 | ............. B60R 19/12 |
| DE | 102004059747 A1 | 6/2006 | |

(Continued)

OTHER PUBLICATIONS

DE Examination Report for DE 10 2017 205 082.9 dated Jan. 1, 2018, 7 pages.

*Primary Examiner* — Joseph D. Pape
*Assistant Examiner* — Dana D Ivey
(74) *Attorney, Agent, or Firm* — Frank MacKenzie; Brooks Kushman P.C.

(57) ABSTRACT

A pedestrian protection apparatus for a motor vehicle front end has a leg-contacting segment which, in a pre-impact position, is arranged completely above an approach plane of the vehicle (which is defined by way of a front approach angle of the motor vehicle), and can be adjusted into a post-impact position by means of a force deflecting apparatus by way of at least proportionally vertical deflection of an impact force which acts along the longitudinal direction. In a post-impact position, the contact segment is arranged at least partially below the approach plane and lower than a bumper crossmember.

18 Claims, 5 Drawing Sheets

(56) References Cited

FOREIGN PATENT DOCUMENTS

DE     102012006530 A1   6/2013
WO       2008062128 A1   5/2008

* cited by examiner

PEDESTRIAN PROTECTION SYSTEM FOR A MOTOR VEHICLE

CROSS-REFERENCE TO RELATED APPLICATIONS

This application claims foreign priority benefits under 35 U.S.C. § 119(a)-(d) to DE Application 10 2017 205 082.9 filed Mar. 27, 2017, which is hereby incorporated by reference in its entirety.

TECHNICAL FIELD

The invention relates to a pedestrian protection system for a motor vehicle.

BACKGROUND

Safety systems of modern motor vehicles firstly aim to avoid accidents, and secondly to avoid or minimize injuries to persons in the case of an accident. This applies firstly to the persons who are situated in the vehicle, but secondly also, for example, to pedestrians or other persons, with which the vehicle might collide. Since said persons are normally not protected per se and cannot profit from restraint systems in contrast to vehicle occupants, it represents a particular challenge in their case to prevent or to minimize injuries.

In the case of collisions with pedestrians, the legs of the pedestrian may be particularly at risk of injury. An impact of the vehicle normally takes place at least primarily in the leg region. In the case of a collision at a relatively low speed, serious injuries can as a rule be avoided if the impact zone, in which the vehicle and the pedestrian collide, is as extensive as possible in the vertical direction. It is advantageous if said impact zone is extended downward at least as far as the center of gravity of the lower leg of the pedestrian. This generally reduces the likelihood of torn ligaments or even more considerable knee injuries, for example, when the pedestrian is struck from the side. For this reason, motor vehicles are often provided with what are known as pedestrian protection reinforcements which extend below the actual bumper.

Whereas a corresponding construction is normally not problematic, for example, in conventional passenger vehicles, there may be a conflict, for example in the case of a vehicle that is intended to drive over uneven terrain (such as a sport utility vehicle or SUV). For such vehicles, there is often a requirement to be able to overcome a relatively great front approach angle, for example of at least 30°. That is to say, the vehicle is to be capable of driving onto a 30° slope from level ground, without coming into contact with the ground. This means that, starting from the contact points of the front wheels, no vehicle part may be situated below the corresponding approach angle.

For the reason indicated above, a fixed or stationary pedestrian protection reinforcement may not be practicable in vehicles of this type. Although active systems which extend or fold out a corresponding reinforcement in a sensor-controlled manner in the case of an accident are known in the prior art, said systems operate either with actuators or pyrotechnical drives which, together with the necessary sensors, increase the vehicle weight and the production costs.

DE 100 31 374 A1 discloses a bumper apparatus for a motor vehicle, having a bumper which is arranged on the vehicle body, and a spoiler segment which is arranged below said bumper. Here, the bumper and the spoiler segment are coupled to one another via a pivotable lever arm in such a way that the bumper is moved backward in the case of an impact thereon, as a result of which the spoiler segment is moved forward via the pivoting connection. In order to provide a contact and impact area of large configuration below the bumper, the spoiler segment is of flap-like configuration and can be pivoted forward in the case of a pivoting action of the lever arm.

DE 10 2012 006 530 A1 discloses a vehicle having an expandable gas vessel and a rigid valance which, coupled to an expansion of the gas vessel, can be lowered into an intermediate space between the body underside of the vehicle and a roadway. Here, the valance can optionally be connected to the vehicle body via a connecting arm of articulated configuration.

U.S. Pat. No. 6,637,788 B1 discloses a bumper arrangement, in which safety apparatuses are arranged above and below the actual bumper, which safety apparatuses serve, in the case of an accident with a pedestrian, to configure a contact zone with the pedestrian, which contact zone is increased in the vertical direction. Here, each of the safety apparatuses is coupled to a sensor and is triggered via a drive, for example pyrotechnically. It can be provided here, in particular, that parts of the trim panel can be moved upward or downward or can be pivoted by means of a hinge, in order to configure the enlarged contact zone.

WO 2008/062128 has disclosed a bumper arrangement for a motor vehicle, in which bumper arrangement an airbag is arranged in front of a bumper crossmember which extends in the transverse direction. In turn, an energy-absorbing foam segment is arranged on its front side behind a vehicle trim panel. In the case of an accident, the airbag is triggered and expands from the bumper crossmember in the forward direction. A lower bumper arrangement is arranged below the bumper crossmember, in which lower bumper arrangement a transverse section is connected to the vehicle body via pivotably mounted lever arms. In a pre-impact position, the transverse section is situated in a withdrawn position, the lever arms being held in position by way of a securing segment. Said securing segment is released if the airbag is triggered, and the pivoting arms rotate, for example by way of spring loading, with the result that the transverse section is displaced forward.

In view of the indicated prior art, the provision of an effective and structurally simple protection system for the legs of a pedestrian with simultaneous ensuring of as great a front approach angle as possible still leaves room for improvements.

SUMMARY

The invention is based on the object of providing a pedestrian protection system for vehicles with a relatively great front approach angle, which pedestrian protection system is effective and as simple as possible in structural terms.

It is to be noted that the features and measures which are indicated individually in the following description can also be combined with one another in any desired, technically appropriate manner, and can indicate further embodiments of the invention. The description additionally characterizes and specifies the invention, in particular, in conjunction with the Figures.

The invention provides a pedestrian protection system for a motor vehicle front. The motor vehicle can be, in particular, an SUV or an off-road vehicle, that is to say a passenger motor vehicle with increased ground clearance and an increased approach angle for improving the off-road capability. The pedestrian protection system serves, in the case of an impact of the motor vehicle with a pedestrian, to prevent or at least to minimize possible injuries to said pedestrian.

Here, the pedestrian protection system has at least one leg protection apparatus. The term makes it clear that this concerns, in particular, the protection of the legs of the pedestrian, namely the lower region of the legs. Otherwise, however, the term is not to be interpreted as restrictive. The plural "legs" is used here and in the following text, which includes the possibility, however, that only one leg is to be protected depending on the circumstances of the accident. The leg protection apparatus might also be called a pedestrian protection reinforcement. The leg protection apparatus has a contact segment. The function of said contact segment consists, in particular, in supporting said lower regions of the legs in the case of an impact and thus as far as possible to prevent the leg from buckling, for example, in the knee region. The contact segment is normally of flat configuration, for example as a plate, and can be planar per se. However, deviations from this are also conceivable. The contact segment can be manufactured, for example, from plastic. It can optionally also form a part of the outer shell of the motor vehicle.

In a rest or pre-impact position, the contact segment is arranged completely above a boundary plane which is defined by a front approach angle of the motor vehicle. Here, as described above, the front approach angle is that angle, below which no vehicle parts are to be located, starting from the contact points of the front wheels. Thus, the boundary plane is alternatively referred to herein as the approach plane. This is the maximum angle of a slope, onto which the vehicle can drive from level ground, without coming into contact with the ground. The front approach angle can be, for example, at least 30° in the case of an SUV or off-road vehicle. With respect to the horizontal plane of the vehicle which is defined by the X-axis (longitudinal axis) and the Y-axis (transverse axis), said boundary plane is inclined by precisely said approach angle, and makes contact (as viewed in an idealized manner) with the contact points of the front wheels. The pre-impact position of the contact segment corresponds to normal, accident-free driving operation of the motor vehicle. In said pre-impact position, the contact segment is arranged above the boundary plane and therefore does not impair the front approach angle. That is to say, inclines can be driven onto as intended.

The position of the contact segment changes in the case of a frontal collision. Here, it can be moved into a post-impact position by means of a force deflecting apparatus by way of an at least proportionally vertical deflection of an impact force which acts in the rearward longitudinal direction (relative to the vehicle), in which post-impact position it is arranged at least partially below the boundary plane and lower than a bumper crossmember. As is customary in the case of a frontal impact, a rearward impact force acts in the longitudinal direction on the vehicle front side. There is, of course, the possibility here that force components also act in the transverse direction, which is insignificant for the method of operation of the pedestrian protection system according to the invention, however. Here, the rearwardly-directed impact force normally acts primarily on a trim panel of the motor vehicle, relatively small impact forces possibly being absorbed by way of a deformation of the trim panel. Subsequently, the rearward impact force can act on the contact segment and/or the force deflecting apparatus. It is expressly possible here that the contact segment is itself part of the force deflecting apparatus. In any case, the force deflecting apparatus acts in such a way that the rearward impact force which acts in the longitudinal direction is deflected at least proportionately into the vertical, as a result of which the movement of the contact segment into the post-impact position takes place. In other words, a vertical force component acts on the contact segment, which vertical force component brings about the movement of said contact segment. The movement can take place by way of a rotation and/or displacement.

In the post-impact position, the contact segment is arranged at least partially below the boundary or approach plane and at least partially lower than a bumper crossmember of the motor vehicle. The latter corresponds to the function of the contact segment of ensuring a support of the legs of the pedestrian below the bumper crossmember. Here, the contact segment does not have to be situated perpendicularly below the bumper crossmember, but rather can be arranged offset toward the front along the longitudinal direction with respect to said bumper crossmember. The at least partial arrangement below the boundary plane therefore means that at least one part of the contact segment is situated in a region which remains free during normal driving operation, in order to ensure the provided approach angle. In the case of an accident with a pedestrian, the priority of course lies in ensuring adequate accident protection, the approach angle being irrelevant.

Insofar as there is a force deflection according to the invention, the pedestrian protection system is preferably of completely passive configuration, that is to say without actuators or other drives. Since the latter are likewise not required, nor are sensors for triggering them, the pedestrian protection system can be realized in an inexpensive and weight-saving manner. No additional power source is necessary, since the force which is produced during the impact is as it were utilized to activate the contact segment.

Embodiments are conceivable, in which the contact segment returns automatically into the pre-impact position, in particular in the case of relatively light impacts, by said contact segment being loaded by way of a restoring segment. This represents only one option, however.

According to one embodiment, a lower segment is connected via a first hinge-line (which defines a first pivot axis) to a structural component of a vehicle body and via a second hinge-line (which defines a second pivot axis) to the contact segment. The vehicle body component can be an element of the body or the chassis. The term "lower" attachment segment is not to be interpreted as being restrictive, but the contact segment is normally arranged at least partially above and forward of the lower segment both in the pre-impact position and in the post-impact position. The lower segment can be, in particular, of plate-like configuration as a lower plate. An attachment plate of this type may preferably be of planar configuration. The hinge-lines or pivot axes which are mentioned may extend in the transverse direction (Y-direction) of the vehicle. They can be formed by way of suitable hinges. The lower plate can also be configured in one piece with the contact segment, however, the second hinge-line being produced by way of a provided kink. In addition to the pivotability, there can also be a displaceability in the region of at least one pivot axis, insofar as this is necessary with regard to the degrees of freedom.

In one embodiment, a forwardmost edge of the contact segment, which edge is opposite from the edge which attached to the lower segment, is connected to the vehicle body in front of the bumper crossmember in the longitudinal direction. Said edge is moved toward the bumper crossmember in the post-impact position in comparison with the pre-impact position. Said forwardmost edge of the contact segment which is normally an upper edge is situated in front of the bumper crossmember, that is to say in a region which is first subjected to the impact force in the case of a frontal impact. Said region is usually also relatively readily deformable, with the result that a force which acts in the longitudinal direction presses in, for example, the trim panel which is present there (and overlies the contact segment) in the direction of the bumper crossmember, and therefore brings it about that the end of the contact segment is moved as described toward the bumper crossmember. A pivoting movement of the contact segment takes place by way of a counterforce which likewise acts in the longitudinal direction, on the part of the lower segment, by way of which pivoting movement at least parts of said contact segment are moved downward, with the result that they are situated below the boundary plane. Since the contact segment is connected to the lower segment, a pivoting movement of the lower segment also takes place here. Overall, at least the contact segment and the lower segment form parts of the force deflecting apparatus. In this embodiment, both the contact segment and the lower segment can extend obliquely with respect to the vertical direction in the pre-impact position, whereas the contact segment extends vertically in the post-impact position.

According to another embodiment, the force deflecting apparatus has an upper segment which is connected via a third hinge-line (or pivot axis) to the contact segment and via a fourth hinge-line (pivot axis) to the vehicle body. The upper segment can also be configured as an attachment plate (which is, in particular, planar). The pivot axes can also once again run in the transverse direction here and can be realized by way of hinges. The upper segment is advantageously configured in one piece with the contact segment, the third pivot axis being produced by way of a provided kink. In the pre-impact position, the upper segment and the contact segment can be inclined with respect to the horizontal plane in an opposed manner with respect to one another; the upper segment is inclined upward and the contact segment is inclined downward as viewed from the front.

Here, the upper segment can be connected via the fourth pivot axis to the bumper crossmember, in particular to an upper section of said bumper crossmember. The bumper crossmember normally has a relatively high stability, with the result that an attachment to it stabilizes the leg protection apparatus overall and increases the reliability of the movement operation.

In order to extend the support of the legs of the pedestrian downward, the contact segment protrudes downward beyond the second pivot axis in one embodiment of the invention. It might be said that the contact segment is extended beyond the region, in which it is connected to the lower segment. In the pre-impact position, the extended end can be arranged adjacently with respect to the lower segment and can move away from the latter during the movement into the post-impact position.

In the above-described embodiments which are normally directed to a pivoting movement of the contact segment and/or at least one attachment segment, the upper segment and the contact segment can have an inclination with respect to the vertical direction in the pre-impact position, which inclination is reduced in the post-impact position. Here, the inclination of the upper segment is normally opposed to the inclination of the contact segment. In particular, the contact segment and possibly also the upper segment can be oriented vertically in the post-impact position. If the upper segment is connected via the fourth pivot axis to the bumper crossmember, it can bear against the bumper crossmember in the post-impact position. It goes without saying that this contributes to the further stabilization of the upper segment and indirectly also to the stabilization of the contact segment which is connected to it.

According to another embodiment, the contact segment is guided such that it can be displaced vertically with respect to the vehicle body. This means that normally no pivoting movement, but rather only a displacement of the contact segment takes place during the movement into the post-impact position. Here, the displacement is at least proportionately vertical, horizontal proportions, for example in the longitudinal direction of the vehicle, also being possible, however. The guide which makes the controlled displacement possible can also in some circumstances serve to support the contact segment in the post-impact position and to secure its position. In addition, as described above, the contact segment can be connected to a lower segment, a displaceability normally being necessary as an additional degree of freedom in the region of the first or the second pivot axis.

In order to realize the displacement, a corresponding force component has to be generated in the displacement direction, to which end a very wide variety of possibilities exist. One advantageous possibility consists in that the force deflecting apparatus has a slide segment which can be displaced in the longitudinal direction and interacts with an upper end of the contact segment for the movement into the post-impact position. A transmission of force from the slide segment to the upper end can optionally take place via a further segment which is arranged in between. According to one structurally simple embodiment, the transmission of force takes place directly, a beveled contact face being configured on the slide segment and/or at the upper end of the contact segment. A vertical force component which ensures the desired displacement of the contact segment is generated via the horizontal displacement of the slide segment by way of the beveled contact face.

In order to ensure sufficient protection against injury for a pedestrian, the pedestrian protection system should extend in the transverse direction over a sufficient part of the width of the vehicle, for example at least 50%. It is fundamentally possible that a single leg protection apparatus extends over the corresponding width. According to one advantageous alternative, however, a plurality of leg protection apparatuses are arranged next to one another in the transverse direction. Here, the contact segments of the individual leg protection apparatuses can be spaced apart from one another in the transverse direction, as long as it is ensured that the legs of a pedestrian are captured by in each case at least one leg protection apparatus. Here, both legs do not have to be captured by a leg protection apparatus, but rather can also be captured by different leg protection apparatuses. The individual leg protection apparatuses can be of identical configuration and can be oriented parallel to one another. It is also possible, however, to adapt the dimensions and the orientation individually to the conditions in different regions of the vehicle front.

Further advantageous details and effects of the invention are described in greater detail in the following text using one exemplary embodiment which is shown in the figures, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, identical parts are always provided with the same designations, for which reason they are also as a rule described only once.

Figure 1:
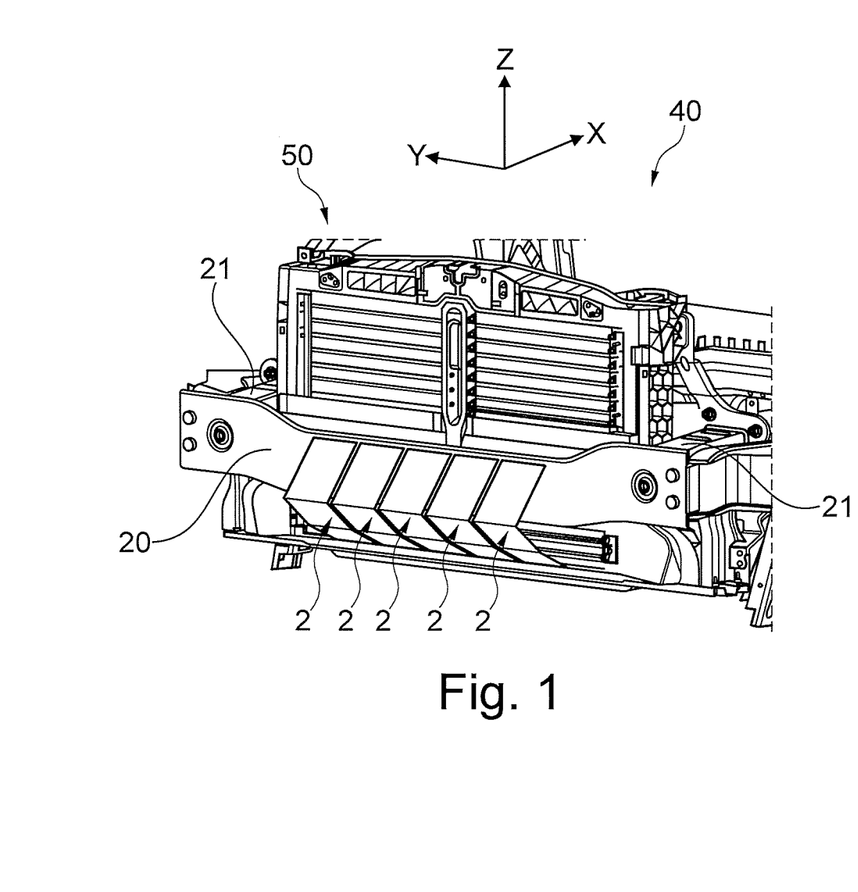
FIG. 1 shows a perspective illustration of a vehicle front having a pedestrian protection system according to a first embodiment.

FIG. 1 shows a perspective illustration of a vehicle front 50 which can belong, for example, to a vehicle body 40 of an SUV or off-road vehicle. In particular, a bumper crossmember 20 can be seen which is connected via two crashboxes 21 to a vehicle frame of the vehicle body 40. Here, the bumper crossmember 20 extends substantially in the transverse direction (Y-direction) of the vehicle. A pedestrian protection system is arranged in front of the bumper crossmember 20 in the driving direction and partially below said bumper crossmember 20, which pedestrian protection system consists of five leg protection apparatuses 2 which are arranged next to one another in the transverse direction.

Figure 2:
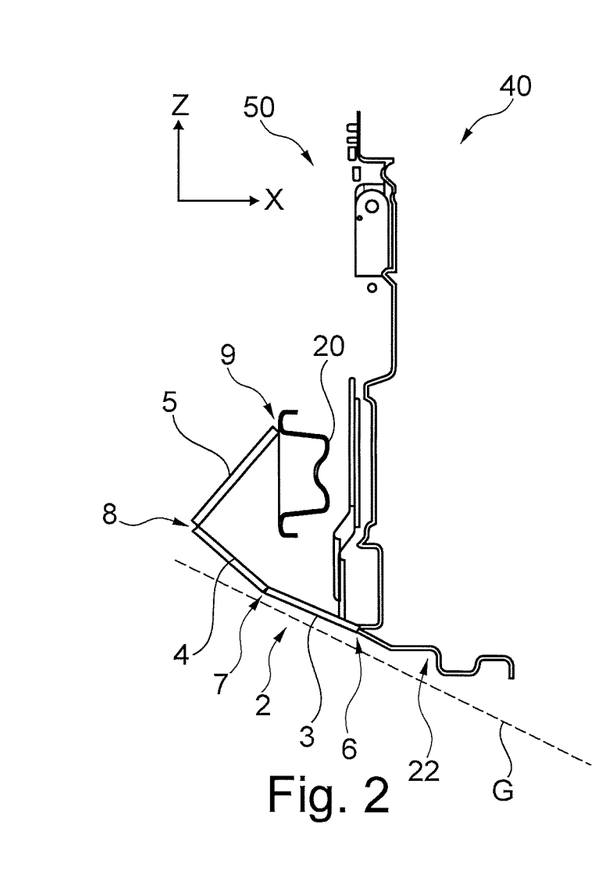
FIG. 2 shows a sectional illustration of the vehicle front from FIG. 1, FIGS. 3A-3C show different phases of an impact between the vehicle front from FIGS. 1 and 2 and a leg of a pedestrian.

Here, FIGS. 1 and 2 represent a pre-impact position of the pedestrian protection system which corresponds to normal driving operation, i.e. prior to any impact with an object or person. As can be seen, in particular, in the sectional illustration along the X-Y plane in FIG. 2, each leg protection apparatus 2 has a lower segment 3, a contact segment 4 and an upper segment 5.

In the present case, said segments 3, 4, 5 are manufactured in one piece, that is to say as a single panel, with integrally-formed hinge-lines or "living hinges" dividing the panel into segments. The lower segment 3 is connected via a first hinge-line or pivot axis 6 to a vehicle structural component 22 located below bumper crossmember 20. The vehicle structural component 22 may be, for example, an undertray. It is possible here that the first hinge-line 6 is configured either via a type of hinge or likewise via a predetermined kink. A second hinge-line or pivot axis 7 is configured between the lower segment 3 and the contact segment 4 by way of the predetermined kink which is arranged there, and a third hinge-line or pivot axis 8 is configured between the contact segment 4 and the upper segment 5. The upper segment 5 is connected via a fourth pivot axis 9 to an upper section 20.1 of the bumper crossmember 20. Each predetermined kink can be formed, for example, by way of a thinned material portion, similar to an integral hinge (also commonly known as a living hinge). In the example which is shown here, the upper segment 5 is, when in the pre-impact position, inclined with respect to the vertical direction (Z-direction), that is to say it has a rising profile from the front to the rear (in the X-direction). The contact segment 4 and the lower segment 3 are likewise inclined with respect to the vertical or Z-direction, but have a falling profile from the front to the rear, with the result that they are inclined in the opposite direction with respect to the attachment segment 5.

When operationally installed in a vehicle, both the bumper crossmember 20 and the leg protection apparatuses 2 are arranged behind a trim panel 30 of the motor vehicle (see FIGS. 3A-C, not shown in FIGS. 1 and 2), which trim panel can consist, for example, of plastic and is relatively easily deformable. The dashed line shows a boundary plane or approach plane G which corresponds to a front approach angle of the motor vehicle. In the present case, the approach angle is approximately 30°, that is to say the motor vehicle is capable of driving onto an incline of up to 30° from level ground, without vehicle parts coming into contact with the ground, the wheels of course being the exception. Accordingly, all parts of the pedestrian protection system, in particular the contact segments 4, are arranged above the approach plane G.

Figure 3A:
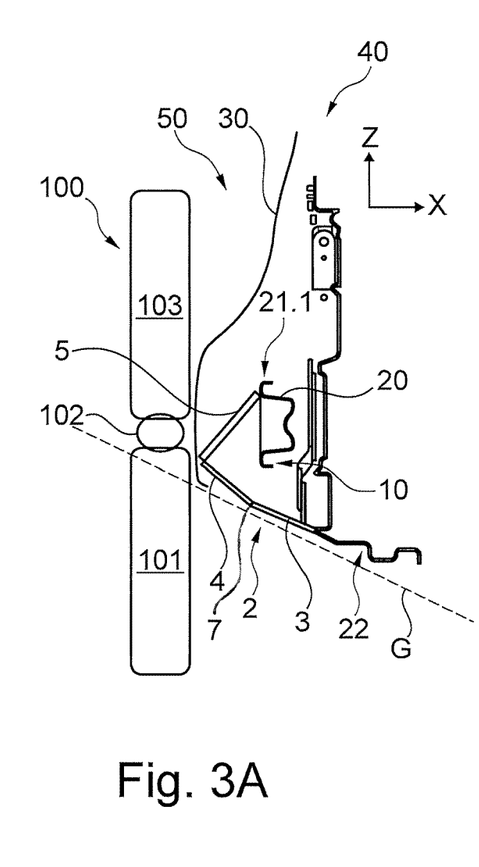
Figure 3B:
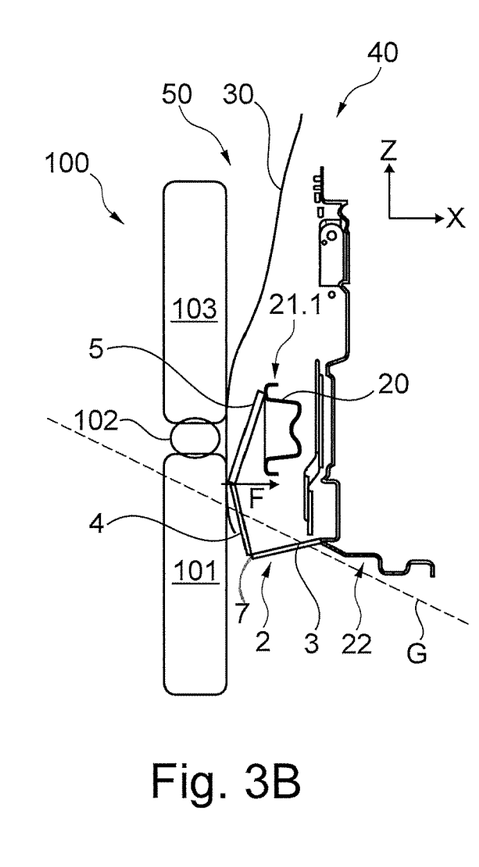
Figure 3C:
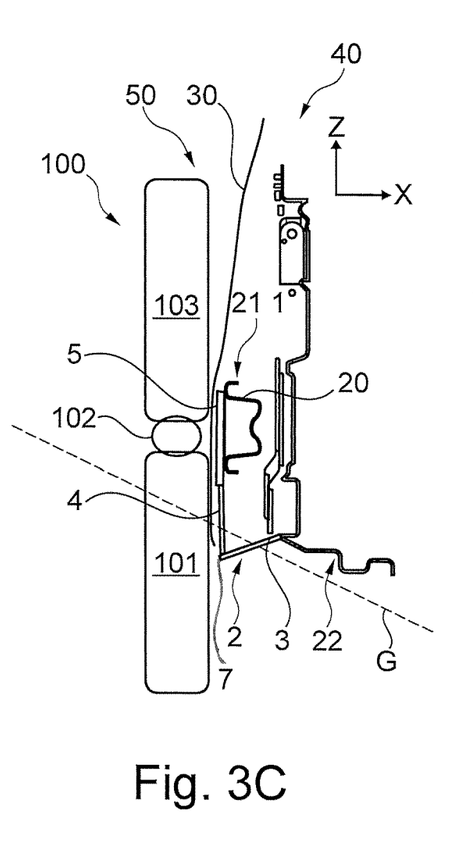

FIGS. 3A-3C illustrate the sequence of an impact between the vehicle front 50 and a leg 100 of a pedestrian. Here, a lower leg 101, a knee 102 and a thigh 103 are shown in a greatly diagrammatic manner. FIG. 3A shows a state directly before the impact of the vehicle front 50 with the leg 100. As can be seen, the bumper crossmember 20 is at a height relative to the leg 100 that it would come into contact directly in the region of the knee 102 if not for the presence of the leg protection apparatus 2, which might lead to torn ligaments, for example.

By way of the invention, however, the leg protection apparatus 2 first of all comes into contact with the leg 100, to be precise in the region in which the contact segment 4 and the upper segment 5 are connected to one another. As a result of the connection of the segments 3, 4, 5 among one another and to the bumper crossmember 20 and the undertray 22, they overall form a force deflecting apparatus 10, by way of which an impact force F which acts in the rearward (relative to the vehicle) longitudinal direction (X-direction) is deflected in such a way that vertical force components are produced. The latter bring about pivoting movements of the segments 3, 4, 5 relative to the vehicle front 50 and relative to one another.

As can be seen in FIG. 3B which shows a further stage of the impact, the lower segment 3 and the upper segment 5 pivot downward here, whereas the contact segment 4 pivots upward. In particular, the inclination of the contact segment 4 and the upper segment 5 is reduced with respect to the vertical direction (i.e. 4 and 5 both move toward a more vertical orientation). FIG. 3C shows a post-impact position of the pedestrian protection system. Here, the pivoting operation has progressed to such an extent that the upper segment 5 bears against the bumper crossmember 20 and extends approximately vertically. The latter also applies to the contact segment 4 which is oriented here as it were as an extension of the upper segment 5 below the bumper crossmember 20. In the post-impact position, the contact segment 4 is arranged predominantly below the approach plane G.

Along its upper edge, the contact segment 4 is supported by the upper segment 5, which for its part is in turn supported by way of the bumper crossmember 20. Along its lowermost edge, the contact segment 4 is supported by the lower segment 3 (by way of the hinged connection which is supported on the undertray 22. To this extent, the contact segment 4 provides a comparatively stable bearing surface for the leg 100 and, in particular, for the lower leg 101. The leg 100 is thereby contacted over a much greater portion of its vertical length/surface area. As a result, the risk of an injury such as torn ligaments is at least greatly reduced.

Figure 4A:
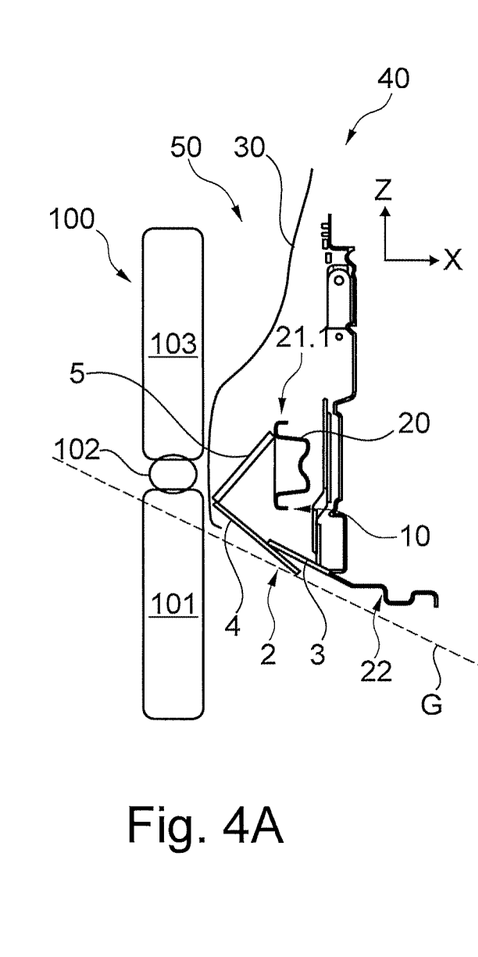
FIGS. 4A-4C show different phases of an impact between a vehicle front with a pedestrian protection system in accordance with a second embodiment and a leg of a pedestrian.
Figure 4B:
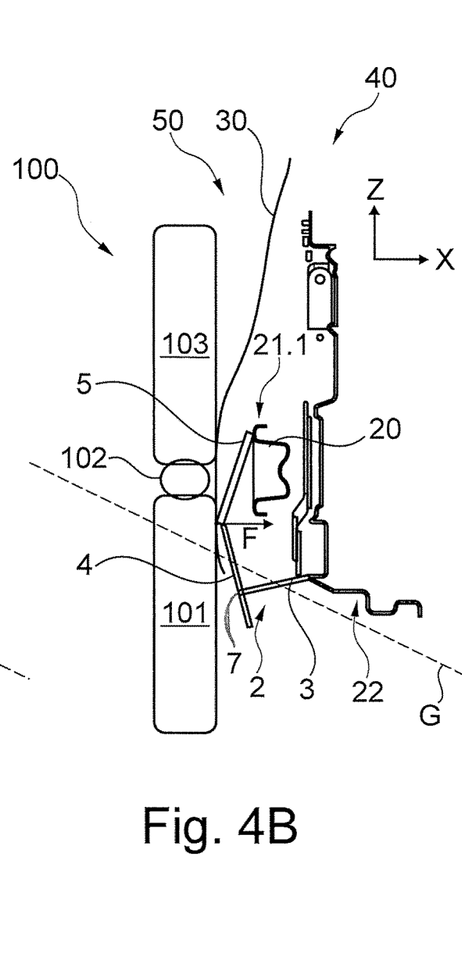
Figure 4C:
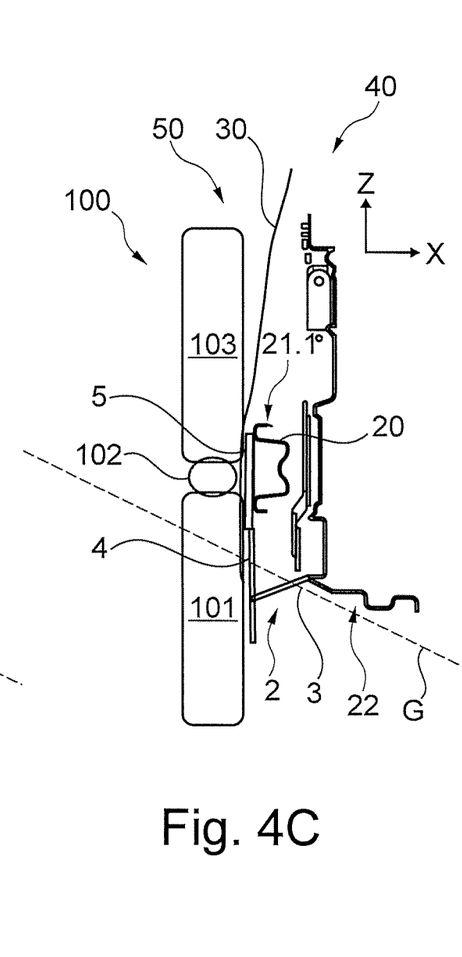

FIGS. 4A-4C show the sequence of an impact in a similar manner to FIGS. 3A-3C, a slightly modified variant of a pedestrian protection system being shown, however. This differs in that the contact segment 4 protrudes downward beyond the second pivot axis 7. As can be seen in FIG. 4A which corresponds substantially to the pre-impact position, it is readily possible here to arrange the contact segment 4 completely above the boundary plane G, which results to this extent in no impairment of the approach angle. In the further course of the impact which is shown in FIGS. 4B and 4C, however, the contact segment 4 extends considerably further downward, with the result that, in the post-impact position in FIG. 4C, the support of the lower leg 101 can once again be improved considerably.

Figure 5A:
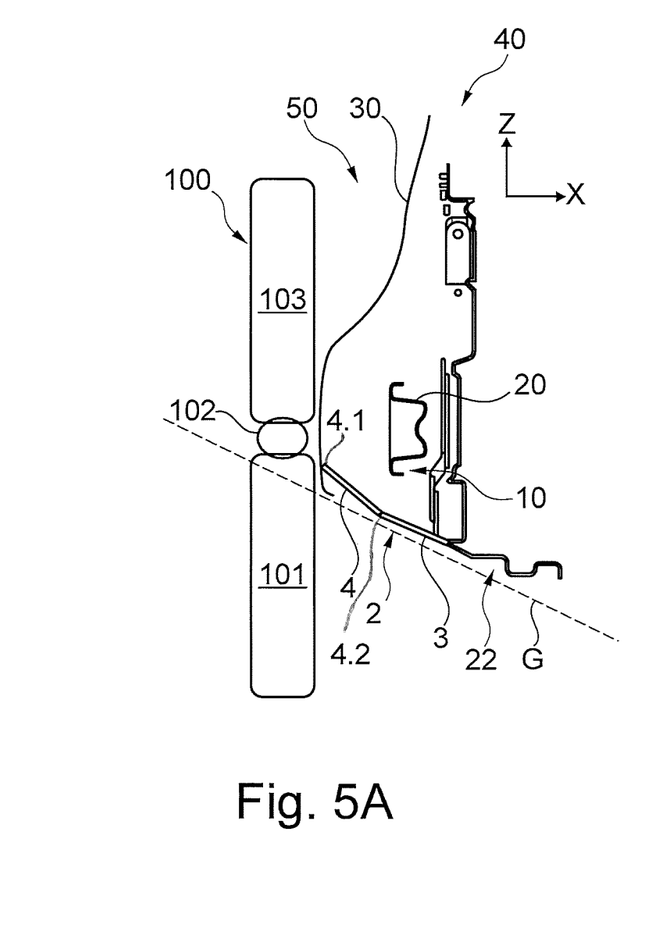
FIGS. 5A-5B show different phases of an impact between a vehicle front with a pedestrian protection system in accordance with a third embodiment and a leg of a pedestrian.
Figure 5B:
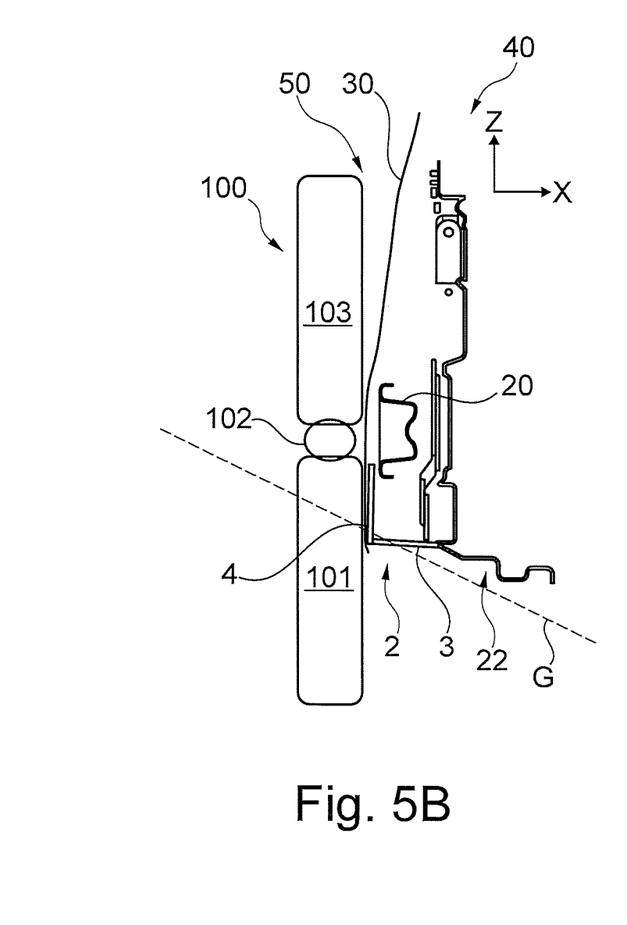

FIGS. 5A and 5B show a third embodiment of a pedestrian protection system, FIG. 5A illustrating the pre-impact position and FIG. 5B illustrating the post-impact position. In this case, the leg protection apparatus 2 comprises merely a contact segment 4 which is hingingly connected along its upper edge 4.1 to the trim panel 30 in front of the bumper crossmember 20, and hingingly connected along its lower edge 4.2 to a lower segment 3 which is in turn hingingly connected to the undertray 22. In the pre-impact position, the two segments 3, 4 are oriented virtually parallel with one another and above the boundary plane G, said segments 3, 4 having a downward inclination. In the case of a collision, an impact force F brings about a deformation of the trim panel 30. The upper edge 4.1 of the contact segment 4 moves together with the trim panel 30 toward the bumper crossmember 20, due to its connection to said trim panel 30. As a result of the connection to the lower segment 3 and as a result of its connection to the undertray 22, a proportionately vertical deflection of force takes place which moves the contact segment 4 downward in a pivoting movement, with the result that, in the post-impact position (shown in FIG. 3B), it is situated partially below the boundary plane G. In this case, the contact segment 4 and, in particular, the lower segment 3 which is connected to the undertray 22 form parts of the force deflecting apparatus 10. In the post-impact position, the contact segment 4 is supported firstly by the bumper crossmember 20 and secondly by the lower segment 3. The contact segment 4 might also be extended beyond the second pivot axis 7 in this embodiment.

Figure 6A:
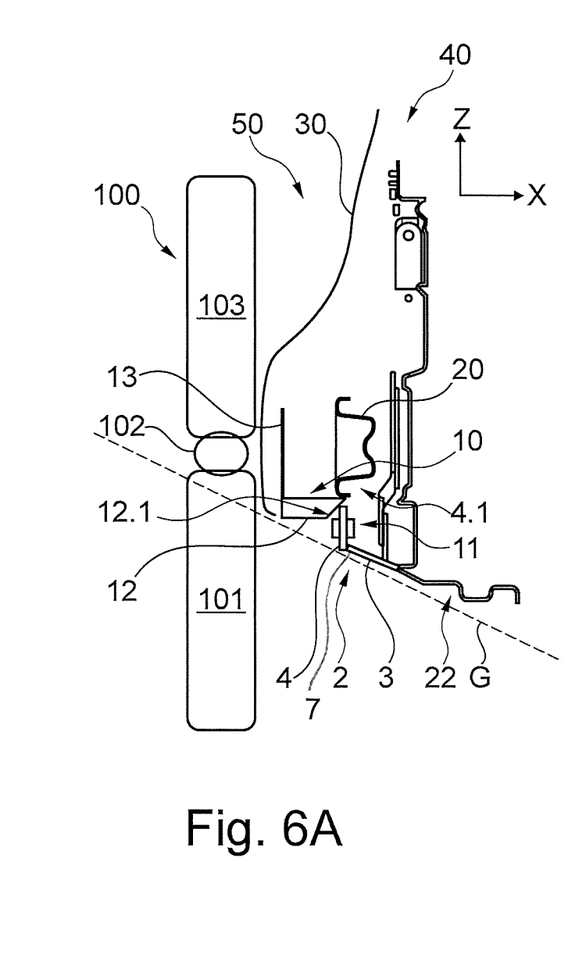
FIGS. 6A-6B show different phases of an impact between a vehicle front with a pedestrian protection system in accordance with a fourth embodiment and a leg of a pedestrian.
Figure 6B:
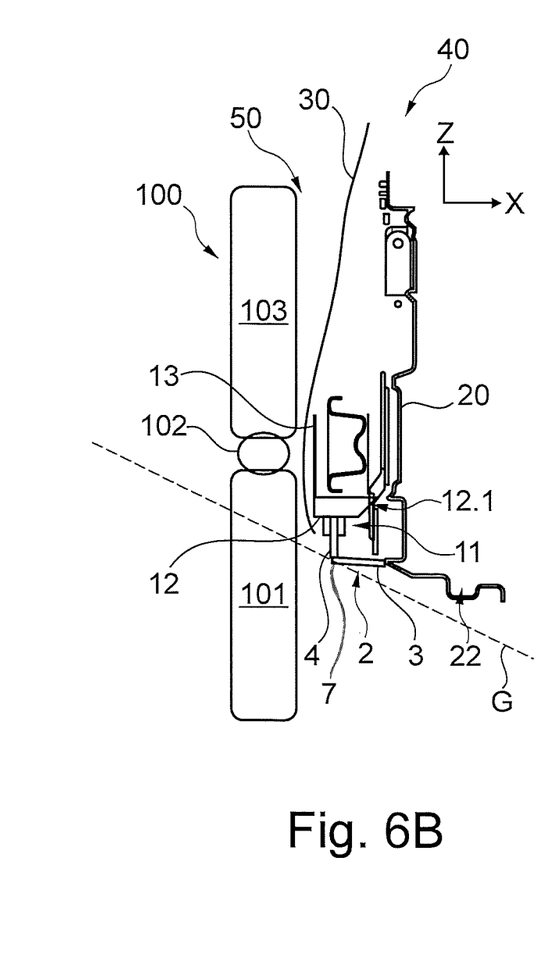

FIGS. 6A and 6B show a fourth embodiment of a pedestrian protection system. Here, the contact segment 4 is received in a schematically illustrated guide 11 which permits a vertical displacement. Furthermore, as in the above examples, the contact segment 4 is hingingly connected at a pivot axis 7 to a lower segment 3, which is also hingingly connected to the undertray 22. In this case, there can advantageously be, in addition to a pivotability, also an at least slight displaceability in the region of the pivot axis 7. In addition, a slide segment 12 is provided which can be displaced in the longitudinal direction and is connected to a perpendicularly oriented supporting plate 13. The latter is arranged adjacently with respect to the former behind the trim panel 30. At a rear end which faces away from the supporting plate 13, the slide segment 12 has a beveled contact face 12.1 which interacts with an upper end 4.1 of the contact segment 4. In the case of an accident, contact with the leg 100 forces the trim panel 30 rearward, as a result of which the supporting plate 13 and the slide segment 12 move together toward the bumper crossmember 20. Here, the contact face 12.1 slides past the upper end 4.1, said contact face 12.1 producing a vertical force component on the contact segment 4. As a result, the contact segment 4 is moved downward into the post-impact position (shown in FIG. 6B), in which it is arranged partially below the boundary plane G, in which, together with the supporting plate 13 and the trim panel 30, it forms an arrangement which lies in approximately the same plane and by way of which the leg 100 is supported. In the present case, the slide segment 12 and the contact segment 4 form parts of the forced deflecting apparatus 10. The lower segment 3 serves mainly to support the contact segment 4 toward the bottom. An additional support is provided by way of the guide 11.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Pedestrian protection apparatus for a motor vehicle comprising:
   a lower segment connected along a first hinge-line located adjacent a rear edge thereof to a vehicle structural component disposed below a vehicle front bumper crossmember, the lower segment pivotable relative to the vehicle structural component about the first hinge-line; and
   a contact segment connected along a second hinge-line to a forwardmost edge of the lower segment, the contact segment pivotable relative to the lower segment about the second hinge-line, the lower and contact segments disposed in a pre-impact position wherein they are inclined upwardly and forwardly from the first hinge-line and are above a plane defined by an approach angle of the vehicle, whereby a rearward-directed force applied to the contact segment causes the contact segment to rotate about the second hinge-line to a substantially vertical position wherein the second hinge-line is below the plane, and rotation of the contact segment causes the lower segment to simultaneously rotate about the first hinge-line to a position wherein the lower segment braces the contact segment against rearward movement.

2. The apparatus of claim 1, wherein a forwardmost edge of the contact segment is connected to a trim panel of the vehicle forward of the front bumper crossmember.

3. The apparatus of claim 1, further comprising an upper segment having a forwardmost edge hingingly connected to a forwardmost edge of the contact segment and a rearmost edge hingingly connected to a second vehicle structural component above the structural component to which the lower segment is connected.

4. The apparatus of claim 3, wherein the second structural component is the bumper crossmember.

5. The apparatus of claim 3, wherein the contact segment is formed integrally with at least one of the lower segment and the upper segment.

6. The apparatus of claim 1, wherein a rearmost portion of the contact segment extends rearwardly beyond the second hinge-line when the segments are in the pre-impact position.

7. A pedestrian protection apparatus for a motor vehicle comprising:
   a lower segment connected along a first hinge-line to a vehicle structural component below a front bumper crossmember, the lower segment pivotable relative to the vehicle structural component about the first hinge-line; and
   a contact segment connected along a second hinge-line to forwardmost edge of the lower segment and pivotable relative to the lower segment about the second hinge-line, the lower and contact segments disposed in a pre-impact position wherein they extend upwardly and forwardly from the structural component, whereby application of a rearward force to the contact segment causes rotation of the contact segment about the second hinge-line to a substantially vertical position and simultaneous rotation of the lower segment about the first hinge-line to a position wherein it braces the contact segment against rearward movement.

8. The apparatus of claim 7, wherein a forwardmost edge of the contact segment is connected to a trim panel of the vehicle forward of the bumper crossmember.

9. The apparatus of claim 7, further comprising an upper segment having a forwardmost edge hingingly connected to a forwardmost edge of the contact segment and a rearmost edge hingingly connected to a second vehicle structural component above the structural component to which the lower segment is connected.

10. The apparatus of claim 9, wherein the second structural component is the bumper crossmember.

11. The apparatus of claim 9, wherein the contact segment is formed integrally with at least one of the lower segment and the upper segment.

12. The apparatus of claim 7, wherein a rearmost portion of the contact segment extends rearwardly beyond the second hinge-line when the segments are in the pre-impact position.

13. Apparatus comprising:
   a panel hingingly connected adjacent to a lower rear end thereof to front-end structure of a motor vehicle disposed below a vehicle front bumper beam and, when in a pre-impact position, inclined upwardly to remain above an approach plane, the panel comprising a forward segment and a rear segment connected thereto by an integral hinge-line and movable, in response to a rearwardly-directed force applied to the panel, to a post-impact position wherein the rear segment has rotated downwardly relative to the front-end structure such that the hinge-line is below the approach plane and the rear segment braces the forward segment against rearward movement.

14. The apparatus of claim 13, wherein a forwardmost edge of the forward segment is connected to a vehicle trim panel forward of the front bumper beam.

15. The apparatus of claim 13, further comprising an upper panel having a forwardmost edge hingingly connected to a forwardmost edge of the forward segment and a rearmost edge hingingly connected to a structural component of the vehicle above the front-end structure to which the panel is connected.

16. The apparatus of claim 15, wherein the forward segment is formed integrally with the upper panel.

17. The apparatus of claim 15, wherein the structural component is the front bumper beam.

18. The apparatus of claim 13, wherein a rearmost portion of the forward segment extends rearwardly beyond the hinge-line when the segments are in the pre-impact position.

\* \* \* \* \*